J. Absterdam.
Refining Iron & Steel.
Reissued Dec. 29, 1868
No. 3249
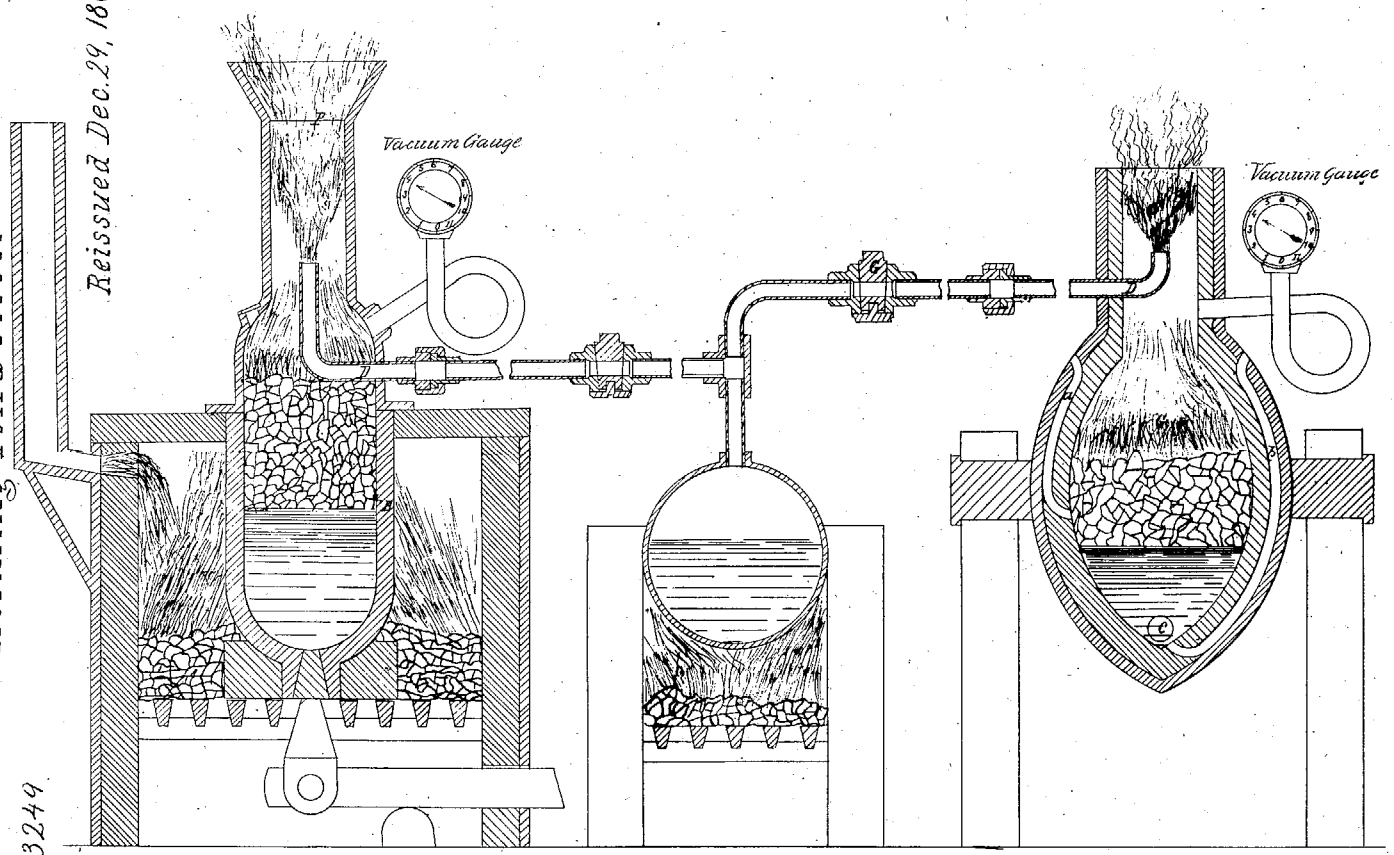
Witnesses
A. Shallock
M. Steele
John C. Absterdam United States Patent Office.

THE FIRST NATIONAL REFINED-IRON AND STEEL-MANUFACTURING COMPANY, OF NEW YORK, N. Y., ASSIGNEES OF JOHN ABSTERDAM, OF SAME PLACE.

*Letters Patent No.* 52,121, *dated January* 23, 1866; *reissue No.* 3,249, *dated December* 29, 1868.

IMPROVED PROCESS FOR REFINING IRON AND STEEL.

The Schedule referred to in these Letters Patent and making part of the same.

*To all whom it may concern:*

Be it known that JOHN ABSTERDAM, of the city, county, and State of New York, has invented a new and improved Process for Refining Iron and Making Steel *in vacuo;* and I, JAMES W. PHILLIPS, President of the First National Refined-Iron and Steel Manufacturing Company, of New York, N. Y., do hereby declare the following to be a full, clear, and exact description thereof, which will enable those skilled in the art to make and use the same.

The nature of this invention consists in a new process of manufacturing iron and steel, by creating and maintaining a vacuum or partial vacuum within the interior of a furnace or pot containing melted iron or steel, so as to extract the impurities from the fused metal, after the same have been dilated into a gaseous state by heat.

Also, in fusing the metal and supplying the air for the combustion of the fuel, by a current or currents of air, produced by creating and maintaining a vacuum or partial vacuum within the furnace, pot, or retort containing the metal.

Also, in vaporizing, dilating, or burning up the impurities and carbon contained in the metal, by means of a current or currents of air produced by the creation and maintenance of a vacuum or partial vacuum within the furnace, pot, or retort containing the metal to be fused.

Also, in the conversion of molten crude iron or of remelted pig or finery-iron into steel or into malleable iron, by means of a current or currents of air, produced by creating and maintaining a vacuum or partial vacuum in the interior of the furnace, pot, or retort containing said molten metal.

In order to explain the process, the accompanying diagram of an apparatus has been drawn, in which the process can be carried out with convenience, although it must be understood that it is not wished to be confined to any particular apparatus in carrying out the invention, but the right is reserved to use an apparatus of any suitable construction, The pot or furnace in which the iron is refined, or the steel made, is constructed in the ordinary manner, and in order to create the vacuum within the furnace or pot, a steam-pipe, D, is introduced in the throat of said pot or furnace, so that a jet of steam, or, if preferred, condensed air, may be injected in said throat from a steam-boiler or generator, the end of said steam-pipe being turned up into the throat, in the direction of the mouth of the furnace or pot.

In the side of the furnace, an opening, G, is made, near the level of the surface of the melted metal in the furnace, and in place of the ordinary tuyere, one or more openings are made through the wall of the furnace, near the throat forming channels between the outer casing and the fire-lining of the furnace, as seen at *a b*.

In order to carry out the process, a commencement is made by laying a few chips of wood, in the bottom of the furnace, and after having filled the furnace up to its throat with coke, coal, or charcoal, or any other fuel, the fire is lighted through the orifice *c*, and in a quarter or half an hour, when the fire is sufficiently kindled, the stop-cock C in the steam-pipe is opened, and the steam let on.

By the action of the steam discharging through the mouth of the furnace or pot a vacuum is created, causing the air to rush below the fuel, and the flame to rush out through the mouth of the furnace, but no flame escapes through the orifice *c*, as is the case in forcing air with the tuyeres.

A few minutes after the steam has been let on, the coke, charcoal, or other fuel begins to settle down, and then alternate charges of fuel, and crude or pig-iron, are thrown in, through the throat or mouth of the furnace, and when the iron begins to melt, similar charges are thrown in every ten or fifteen minutes.

Before the metal begins to melt, or when commencing to melt, the orifice *c* is closed with a lump of moist clay.

The air is supplied through the orifice and channels *a b*, and as soon as the level of the melted metal rises near the opening or large orifice G, said orifice is opened, and the slag raked out from the surface of the fused metal, and when this operation is completed, a higher pressure of steam is let on, so as to produce an increased rarefaction of the air in the furnace, and to cause the air to pass through the melted metal with increased rapidity, causing the heat to become more intense.

By this means the impurities of the iron are evaporated or dilated into gases, which are carried away by the suction of the steam.

The air, in passing through the melted metal, also burns a portion of the carbon contained in the metal, thus transforming the iron into steel.

After having extracted or dilated the impurities from the metal, and having reduced the percentage of carbon to the proper standard, the supply of air is stopped altogether, and a still higher pressure of steam let on, still further increasing the rarefaction of the air within the furnace or pot, for the purpose of better extracting the impurities that may still remain in the melted metal.

When it is ascertained that the impurities have disappeared, by testing a sample at different stages of the process, the slag is again raked out from the surface of the fused metal, through the orifice G, and after the metal has been deprived of its impurities, it is run off, either by piercing the plug of the orifice *c*, or by inclining the furnace or pot, with its mouth downwards, by turning the same on its trunnions, and the ingots obtained by this process are drawn and annealed in the ordinary way.

The process in making steel from crude or pig-iron is the same as in refining iron, with the exception that in the iron only the percentage of carbon required in making steel is left.

In order to make steel of a superior quality, the metal is run off from the furnace in thin slabs, which are broken into small fragments, and remelted in the second pot or furnace, and cast again, as desired.

The second pot or furnace is simply a large crucible, having an orifice on its side, near its bottom, or in its bottom, and set stationary in a furnace, and having its mouth secured in fire-brick, with an opening through the bricks, forming a flue in line with the interior of the crucible.

The upper end of this flue is contracted, and joins a neck, P, with a bell-shaped mouth, and through this neck the steam-pipe is introduced, the end of which turns up parallel with the side of said neck.

From this description it will be seen that the process is accomplished by seven distinct manipulations, as follows:

First, the iron is melted in a furnace or pot, where the draught is created by producing and maintaining a vacuum or partial vacuum within the furnace.

Second, to rake the slag or dross from the surface of the melted iron, which operation is effected without stopping the supply of air for combustion.

Third, to let in a heavy pressure of steam, in order to cause a rapid circulation of air through the molten mass of iron, so as to burn away some of the carbon of the iron, and to dilate the impurities into gaseous vapors, and separate them from the iron, as much as possible, by the vacuum.

Fourth, to reduce the pressure of steam, and allow the melted metal to settle down, so as to again rake off the slag from the surface of the metal.

Fifth, to stop the supply of air entirely, and to increase the pressure of steam in the throat of the furnace, so as to create and maintain a total vacuum within the furnace or pot, for the purpose of finally extracting all the gaseous impurities, by the process of distillation *in vacuo*.

Sixth, to cast the steel obtained by the previous manipulations, in ingots, or in the form of any object desired, and draw and anneal the same, as desired.

Seventh, to obtain steel of a superior quality, the steel so obtained is broken up into small fragments, and remelted again in the second furnace or crucible, by adding to it some oxides of manganese, and other carbonic substances, in the ordinary manner. A vacuum is also created and maintained within the said crucible, so as to exclude the atmospheric air from the interior of the pot in fusing the metal, and to prevent the oxidation of the steel, and afterwards the metal is run out, and cast again, as desired.

During this process, the means for producing the vacuum may be varied, although the steam-arrangement is used by preference, as described.

The process is not confined to the manufacture of iron and steel from pig or crude-iron, for cast-steel is also made by melting blistered steel by the same process.

By melting in the second pot or crucible marked B, the vacuum created and maintained within the interior of the same pot also facilitates the dilation and extraction of the impurities that may be contained in the iron before cementation.

The advantages of the invention are as follows, viz:

First, by melting the iron under a vacuum or partial vacuum maintained within the interior of the furnace, a well-equalized distribution and pressure of air throughout the whole mass is obtained.

Second, in producing a rapid circulation of air through the molten mass, by means of the vacuum created and maintained in the interior of the pot or furnace, the pressure of air and combustion of carbon throughout the molten mass are equalized.

Third, in obtaining a current of air through the molten metal, entering the furnace of its own accord, without being forced, it facilitates the running out of some of the molten metal, for its examination at different stages of the process.

Fourth, in continuing the vacuum after the supply of air has been stopped, the remaining gaseous impurities are extracted from the molten metal by distilling them *in vacuo*.

Having thus described this invention,

What is claimed as new, and desired to be secured by Letters Patent, is—

1. The within-described process of manufacturing iron and steel, by creating and maintaining a vacuum or partial vacuum within the interior of a furnace or pot containing melted iron or steel, substantially as set forth.

2. Fusing the metal and supplying the air for the combustion of the fuel, by a current or currents of air, produced by creating and maintaining a vacuum or partial vacuum within the furnace, pot, or retort containing the metal.

3. Vaporizing, dilating, or burning up the impurities and carbon contained in the metal, by means of a current or currents of air, produced by the creation and maintenance of a vacuum or partial vacuum within the furnace, pot, or retort containing the metal to be fused.

4. The conversion of molten crude-iron or of remelted pig or finery-iron into steel or into malleable iron, by means of current or currents of air, produced by creating and maintaining a vacuum or partial vacuum in the interior of the furnace, pot, or retort containing said melted metal.

JAMES W. PHILLIPS,
*President.*

Witnesses:
W. HAUFF,
ERNEST F. KASTENHUBER.